Feb. 1, 1966 J. I. RAFFEL 3,233,187

MAGNETO-RESISTIVE AMPLIFIER

Filed March 6, 1962

JACK I. RAFFEL
INVENTOR.

BY Edward D. Thomas
AGENT

United States Patent Office 3,233,187

Patented Feb. 1, 1966

3,233,187

MAGNETO-RESISTIVE AMPLIFIER

Jack I. Raffel, Groton, Mass., assignor to Massachusetts Institute of Technology, Cambridge, Mass., a corporation of Massachusetts Filed Mar. 6, 1962, Ser. No. 177,894
8 Claims. (Cl. 330—62)

This invention relates to a magnetoresistance device and more particularly to a magnetoresistive four terminal device in which resistance change in a thin film of magnetic material caused by the rotation of its remanent magnetization by an external magnetic field controls the flow of energy to a load.

The magnetoresistive effect is a change in the electrical resistance of a material with an applied magnetic field. The resistance increases or decreases depending on whether the field is parallel or perpendicular respectively to the direction of measurement. While all metals exhibit this effect, germanium, indium antimonide and bismuth are among the highest. The effect is very sensitive to changes in temperature and purity, increasing with decreasing temperature and increasing purity. The effect also varies with thickness.

If an electrical network can be devised containing magnetorestrictive elements so that a change of magnetic field is produced by a changing current, and, if the resulting change of resistance in turn produces a change of current which is greater than the primary change, then the network represents an amplifier. Prior attempts to exploit this effect have generally used bismuth, but at room temperatures a field of thousands of oersteds is required for a resistance change of a few percent.

In magnetic materials, the situation becomes more complicated by the contribution of the remanent magnetic field of the material itself. Although it is possible to switch the magnetization from one direction of remanent flux to the opposite direction by very low external fields, in bulk form the fields required to rotate the magnetization direction are extremely high due to the contribution of shape anisotropy. Consequently, the magnetorestrictive effect has not been found useful in bulk magnetic materials.

Recent studies of the magnetic properties of extremely thin vacuum deposited films of magnetic materials have revealed that when the films possess an easy axis of direction of remanent flux, it is possible to obtain rotation of magnetization of the material through 90° by the application of external magnetic fields as low as one oersted. Reference may be made to the paper by F. G. West, Nature, vol. 188 p. 129, 1960. The present invention contemplates making use of the built-in magnetic field of a thin film of magnetic material to produce a change of electrical resistance between parallel and perpendicular orientation when the direction of the built-in field is rotated 90° by the application of a small external field perpendicular to the easy axis of magnetization of the film.

It is, therefore, a primary object of the invention to provide a four terminal electrical network employing thin film magnetic magnetoresistive elements which functions as an amplifier.

Consider a thin magnetic film whose magnetization lies in the plane of the film in a preferred direction. If a current is passed through the film, and a coil is wound around the film so as to produce a field perpendicular to this current, then a load connected in parallel with the film will receive a change in current if the coil is excited. There will be power gain if the power to drive the coil is less than the power extracted by the load. Once the conditions for obtaining gain are realized, then by the use of feedback from the point at which resistance is changing to the field coil oscillations become possible and a wide variety of circuit configurations can be visualized. Considerable circuit flexibility is provided by the fact that the device is a four terminal network.

It is a further object of the invention to provide a thin film magnetoresistive element responsive to a small external field to cause a useful change in electrical resistance by the rotation of its remanent magnetization.

These and other features of the invention will be better understood by reference to the following detailed specification and the accompanying drawings, in which.

Figure 1:
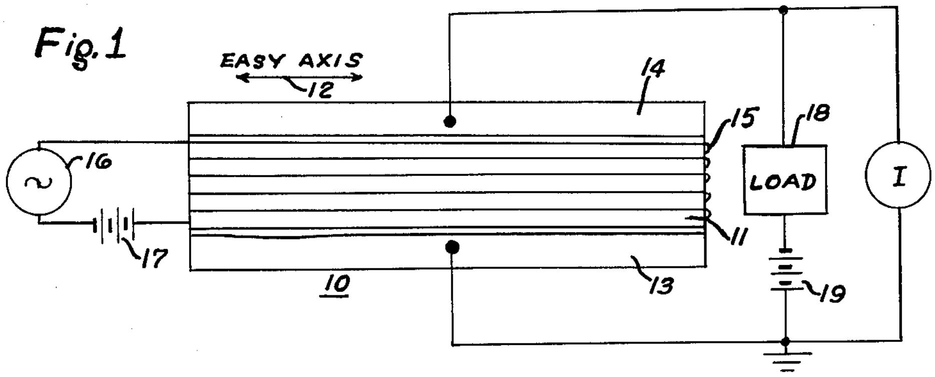
FIGURE 1 illustrates the basic circuit of the invention.

With reference to FIGURE 1, a magnetoresistive element 10 is shown to be constructed of a film 11 of magnetic material which is assumed to have been treated to obtain an easy axis of magnetization in the direction indicated by arrow 12. Typically, the film 11 can be vacuum deposited on a glass substrate (not shown) in the presence of a magnetic field. At each end of film 11 parallel to the easy axis ohmic contacts 13 and 14 are applied to film 11.

The external field to produce rotation of the remanent magnetization of magnetic film 11 is obtained by means of coil 15 which is wound about film 11 in a direction such that current through coil 15 produces a field transverse to the easy axis of film 11. Coil 15 is shown to be energized from signal source 16 and to be biased by a D.C. source such as battery 17.

To complete the circuit, a current source I is shown connected to contacts 13 and 14 to produce a current flow substantially perpendicular to the easy axis and a load 18 biased by battery 19 shunts film 11.

When the film has previously been placed in a saturating field along the easy axis, the resistance of the film measured by a current parallel to the easy axis will differ from the resistance measured by a current normal to the easy axis by an amount $\Delta R_0$. The percentage change $\Delta R_0/R \times 100$ has been found to be about 2% for films and to vary with film thickness in the manner illustrated in FIGURE 2. Films having a thickness of about 4000 A. have yet to reach the full value and for films thinner than about 1000 A. the percentage change of resistance decreases sharply. The maximum change $R_0$ appears to be a characteristic of the particular material.

Figure 3:
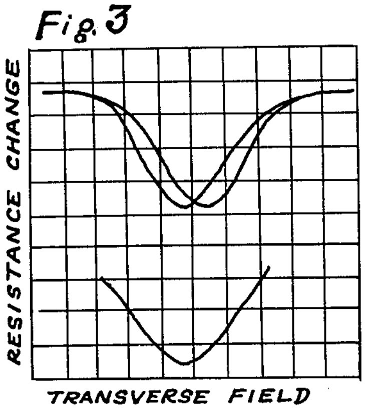
FIGURE 3 is a graphical representation of the change of resistance with change of applied transverse field of the magnetoresistive element of FIGURE 2.

When the film has been previously saturated along the easy axis and a field $H_t$ is applied in the plane of the film normal to the easy axis, the magnetoresistance effect is found to be $$\frac{\Delta R}{\Delta R_0} = (H_t/H_k)^2$$

where $H_k$ is the anisotropy field value. Oscilloscope traces of the magnetoresistive effect vs. applied transverse field, as shown in FIGURE 3, confirm the parabolic relationship. Where the transverse field is kept relatively small, the process is one of reversible rotation. With increasing transverse field, it is probable that local deviations of the direction of anisotropy within the film contribute to rotational hysteresis.

Figure 4:
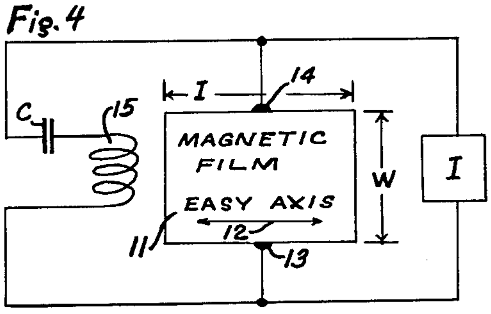
FIGURE 4 illustrates the modification of the circuit of FIGURE 1 to produce oscillations.
Figure 5:
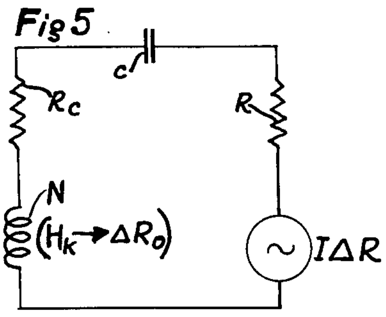
FIGURE 5 is the equivalent circuit of the oscillator of FIGURE 4.

One of the techniques for studying the properties of the magnetoresistive element 10 is to modify the circuit of FIGURE 1 by connecting the coil 15 through capacitor C across the film in place of load 18, as shown in FIGURE 4. If the inductance of the circuit is neglected, a change of resistance in the film 11 of $\Delta R$ with a direct current I flowing would result in a change of current in the coil 15

$$\Delta I=\frac{I\Delta R}{R+R_c} \quad (1)$$

as seen in the equivalent circuit in FIGURE 5. This will generate a field $\Delta H_t$ given by $$\Delta Ht=\frac{4\pi\Delta IN}{10W} \quad (2)$$

where I is the current in amperes, $H_t$ is the transverse field in oersteds, N is the number of turns of coil 15, and W is film width in centimeters. $\Delta H_t$ in turn will tend to rotate the magnetization of film 11, thus causing a further change in $\Delta R$. A feedback condition is here described which will exhibit positive gain if $$\frac{4\pi dRN}{10(R+R_c)W}>dH \quad (3)$$

is satisfied.

If now by applying a bias, as by battery 17 of FIGURE 1, the operation of the element 11 can be located on the curve of FIGURE 3 where:

$$dR/dH=\Delta R_0/H_k \quad (4)$$

then the loop gain expression becomes:

$$G=\frac{4\pi I\Delta R_0N}{10(R+R_c)WH_k} \quad (5)$$

To find an expression for maximum gain, certain approximations have to be made. However, the resistance R of the film is $\rho_fW/lt_f$ and that of the coil $R_c$ is $2N^2\rho_cl/Wt_c$ where $\rho_f$ and $\rho_c$ are the resistivities and $t_f$ and $t_c$ are the total thickness of the film 11 and the coil 15 respectively.

The gain of the device varies linearly with the current I which is limited by the power dissipation per unit area of the film to have a maximum value expressed as $$K=\frac{I}{l}$$

The film cannot be made too thick or too narrow because the demagnetizing fields introduced would tend to raise $H_k$ unreasonably. For a 1000 A. film W should be greater than 60 mils to limit the demagnetizing effect.

The total thickness of N turns of copper $T_c$ must be chosen to be as thick as possible for low losses, but not so thick that coupling to the film becomes too low. If the thickness of copper $t_c$ is limited to $W/2$, the extremities of the copper will be a distance from the film equal to half the width of the film; at such a distance the coupling is still significant but well below that of closer turns.

Substituting into Equation 5 the resistivity expressions and those of power dissipation and coil thickness, the loop gain expression becomes:

$$G=\frac{4\pi\Delta R_0KaN\rho_f/t_fa}{10R(\rho_f/t_{fa}+4aN^2\rho_c/W)H_k} \quad (6)$$

where $a$=the ratio of length of width of the film.

Taking $R_c=R_f$ for maximum gain and equating:

$$\frac{\rho f}{t_fa}=\frac{4aN^2\rho_c}{W}$$

the aspect ratio is found to be:

$$aN\sqrt{\rho_fW/4\rho_ct_f} \quad (7)$$

and the loop expresion for optimum gain becomes $$G=\frac{4\pi K\Delta R_o}{20R}\sqrt{\frac{\rho_fW/4\rho_ct_f}{H_k}} \quad (8)$$

Thus when the resistance of the coil is matched to the resistance of the film, the gain is independent of the number of turns of the coil. This shows that it is possible to vary N and the ratio of length to width of the film but for opitmum conditions the $a$N product and the gain are fixed.

Equation 8 also shows that increased gain can be accomplished by raising $\Delta R_o/R$, lowering $H_k$, increasing the allowable power dissipation per unit area, or increasing W. Increasing W is significant because this allows a greater thickness of copper to be coupled to the film. The gain can, therefore, be increased as the square root of W at the cost of increasing N. The upper frequency limit of the oscillator of FIGURE 4 will be determined primarily by interwinding capacitance; as N becomes large, this will become increasingly significant. If N is kept low and $a$ is increased, the upper frequency limit is increasingly higher.

By way of example, an operating device using the circuit of FIGURE 4 had the following parameters: $N=550$ turns, $H_k=0.6$ oersted, $l=0.4$ inch, $W=1.2$ inches, $t_f=3000$ A., $I=1.0$ ampere and $\Delta R_o/R=3\%$ for permalloy at the temperature of liquid nitrogen. Operating in liquid nitrogen the frequency of oscillation could be varied up to 10 kc. by changing the size of the feedback capacitor C.

Since the room temperature gain, where $\Delta R_o/R=2\%$ and $I=0.5$ ampere would be about 5 when calculated from Equation 8, the assumption involved should be kept in mind. Further, severe heating of the film occured due to poor air circulation and probably the value of $\Delta R_o/R$ was much below the value measured in free air. Since $\Delta R_o/R$ is known to be sensitive to temperature changes, immersion in liquid nitrogen represents one way in which a more favorable value of $\Delta R_o/R$ can be obtained along with an increased allowable power dissipation.

Further, in part, as illustrated in the top curve of FIGURE 3, hystersis appears in the magnetoresistance curve which reflects the complicated domain structure which accompanies high field rotation. Since the assumption of reversible rotation is implied in the calculation of $H_k$, the existence of a multi-domain hysteresis loop in the oscillator at room temperatures probably causes the value of $\Delta R_o/H_k$ to be below the value used for calculating gain at room temperature.

Obviously, the most direct way to increase gain is to use a film of improved characteristics with respect to $\Delta R_o/R$ ratio, lower $H_k$ and the elimination of hysteresis in the flux rotation loop. The use of cooling always improves this situation.

Figure 2:
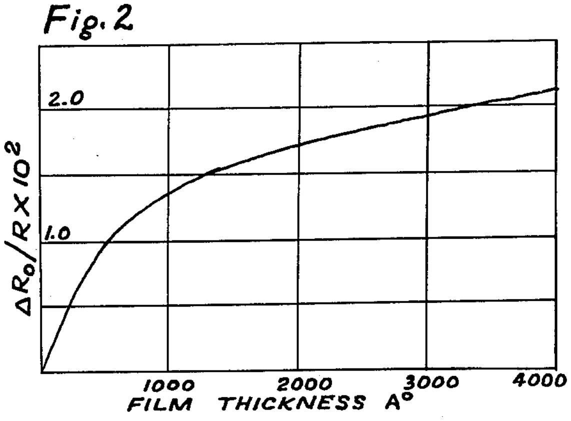
FIGURE 2 is a graphical representation of the relation between film thickness and percentage change of resistance.

To some extent, a number of M sections of film placed in parallel will decrease the film impedance and increase the current flow without adding coil resistance. This configuration will increase the gain by a factor of $\sqrt{M}$. But stacking the films leads to a higher demagnetization loss and sets a limit on the improvement which can be obtained. If it were possible to use stacked thinner films, then the total dissipation could be increased by separately cooling each layer without decreasing the demagnetization energy, but, as shown in FIGURE 2, the magneto-resistive effect decreases rapidly below 1000 A.

Much of the foregoing complications results from trying to match the resistance of a very thin film to a relatively thick coil.

Now one way of varying the copper cross section independently of film width is to provide a low reluctance magnetic return path for the film flux. Close coupling of the relatively remote areas of copper can then be obtained. If the return path reluctance is neglected, the gain for the matched case becomes:

$$G=\frac{4\pi\Delta R_oNK_a}{20RH_k}$$

and is dependent only on $\Delta R_o/R$, K, $a$, N and $H_k$. By increasing $a$ or the product $a$N the gain may be made as large as desired provided the cross-sectional area of copper is large enough to match the film resistance.

The foregoing relationships were derived for the narrow-band case of the oscillator by neglecting the coil inductance. The general bandwidth equation for the amplifier may be determined by calculating the $L/R$ time constant. For the matched case of $R=R_c$ and assuming all turns of the coil concentrated at a distance $W/4$ from the film, an approximate value of inductance is calculated, $L \approx M_0 N^2/2$, the loop resistance is $2R=8\rho_c N^2/W^2$ and the time constant becomes:

$$T=L/2R=M_0 W^2/16\rho_c$$

For $M_0=4\pi \times 10^{-7}$ henries/meter, $W=1.5\times 10^{-3}$ meters, $\rho_c=2.0\times 10^{-8}$ ohm meter, the value of T comes out $0.9\times 10^{-5}$ sec. This calculation assumes perfect coupling between turns and a higher than actual value of average flux. However, the value of about 10 microseconds is a reasonably conservative one.

From Equation 9, bandwidth is seen to vary inversely with $W_2$ which means that the gain bandwidth product is not a constant since gain varies directly with $\sqrt{W}$ It should also be pointed out that once a bias such as battery 17 of FIGURE 1 has been applied to field coil 15, the internal field of film 11 has been rotated angularly with respect to the easy axis 12. Consequently the application of an external field along the easy axis will have the effect of rotating the internal field back toward the easy axis. Since it is the rotation of the internal field which is effective in the present invention to produce the magnetoresistive effect, many procedures by which the application of external magnetic field produces rotation of the internal field of the film may be used in place of the illustrated embodiment of the invention.

When the load 18 of FIGURE 1 is made the field coil 15 of a succeeding network and when the value of battery 19 is adjusted to bias the magnetoresistive element of the succeeding network to a desired point on its characteristic, cascaded amplification is readily obtained.

Having thus described the invention, it will be apparent that numerous modifications to suit various applications may be made by those skilled in the art without departing from the scope contemplated by the invention. Consequently, the invention herein disclosed is to be construed as limited only by the scope of the following claims.

What is claimed is:

1. A magnetoresistive four terminal electrical network comprising, a magnetoresistive element having a nonconductive substrate supporting an anisotropic coating of thin film magnetic material having an internal magnetic field laying in the plane of the film along a preferred easy axis of magnetization a pair of spaced conductors parallel to said axis making ohmic contact to said film, a source of electrical energy connected by said conductors to said element to produce current flow across said film of magnetic material in a direction transverse to said axis, a load shunting said element, a field coil having a plurality of turns wound around said element in a direction to produce a magnetic field transverse to said axis, and means for energizing said coil to apply an external field to said element transverse to said axis to cause rotation of said internal field, whereby the magnetoresistive change of resistance of said element in response to said rotating internal field changes the power delivered to said load.

2. A magnetorestive amplifier circuit comprising, a nonconductive substrate coated with a thin film of magnetic material having an internal magnetic field lying in the plane of the film along a preferred easy axis of magnetization, a pair of spaced conductors parallel to said axis making ohmic contact to said film, a source of electrical energy connected by said conductors to said film to cause current flow transverse to said axis, a load circuit shunting said film, a field coil having a plurality of turns wound around said film in a direction to produce an external field transverse to said axis, means for biasing said field coil to produce a predetermined quiescent transverse field, and a signal source connected to said coil to produce a variation in said transverse field in response to said signal whereby the magnetoresistive change of film resistance in response to the rotation of said internal field by said external field changes the power delivered to said load in accordance with said signal.

3. A magnetoresistive oscillator circuit comprising, a magnetoresistive element having a nonconductive substrate supporting an anisotropic coating of thin film magnetic material having a remanent magnetic field lying in the plane of the film along a preferred easy axis of magnetization a pair of spaced conductors parallel to said axis making ohmic contact to said film, an electrical energy source connected by said conductors to said film to produce current flow transverse to said axis, a field coil having a plurality of turns wound about said film in a direction to produce a magnetic field transverse to said axis, means for coupling said coil to said film in a feedback loop, whereby change of resistance of said film produces a change of current in said coil and generates a varying magnetic field transverse to said axis and a further resistance change in said film from the rotation of said remanent magnetic field under the influence of said transverse field, and means to bias said coil to a region where the rate of change of film resistance with rate of change of transverse field produces sustained oscillations at a frequency determined by the capacitance of said feedback loop.

4. A magnetoresistive electrical network comprising, a magnetoresistive element having a nonconductive substrate supporting a coating of thin film magnetic material whose magnetization lies in the plane of said film along the direction of minimum anisotropy energy axis, a source of electrical energy connected to said film to produce current flow therein, a load circuit shunting said element, means for applying a predetermined steady external magnetic field transverse to said axis to cause said internal field of said element to rotate away from said axis thereby biasing said element to a desired quiescent state along its magnetoresistive characteristic, and means to apply a varying external magnetic field to cause rotation of said internal field from its quiescent state whereby the change of electrical resistance of said element caused by the rotation of said internal magnetic field changes the current flowing through said load.

5. A magnetoresistive four terminal electrical network comprising, a magnetoresistive element having a nonconductive substrate coated with a thin film of magnetic metal with a remanent magnetic field lying in the plane of the film along a preferred easy axis of magnetization, a pair of spaced conductors arranged parallel to said axis and making ohmic contact with said film, a source of electrical energy connected to said conductors to produce a flow of current in said film in a direction transverse to said axis, and means for applying an external magnetic field transverse to said axis to cause said remanent field to rotate whereby the magnetoresistive effect changes the resistance of said film and the amount of current flow in said film.

6. A magnetoresistive four terminal electrical network comprising, a magnetoresistive element having a nonconductive substrate coated with a thin film of magnetic metal with a remanent magnetic field lying in the plane of the film along a preferred easy axis of magnetization, a pair of spaced conductors arranged parallel to said axis and making ohmic contact with said film, a source of electrical energy connected to said conductors to produce a flow of current in said film in a direction transverse to said axis, a load shunting said element and means for applying an external time varying magnetic field transverse to said axis to cause said remanent field to rotate whereby the magnetoresistive effect changes the resistance of said film and the amount of current flow in said film to vary the power delivered to said load.

7. A magnetoresistive amplifier circuit comprising a magnetoresistive element having a nonconductive substrate coated with a thin film of magnetic metal having an internal remanent magnetic field lying in the plane of the film along an easy axis of magnetization, a field coil having a plurality of turns wound around said element in a direction to produce an external magnetic field transverse to said axis, means for biasing said field coil to cause rotation of said film magnetization away from said axis to bias said element to a predetermined state along its magnetoresistive characteristic, a source of electrical energy connected to said film to produce a flow of current therein transverse to said axis, and means for applying a time varying current to said coil to produce a time varying external field to cause rotation of said internal magnetic field from its quiescent state to vary the resistance of said film and the current flow therein.

8. A magnetoresistive amplifier circuit comprising a magnetoresistive element having a nonconductive substrate coated with a thin film of magnetic metal having an internal remanent magnetic field lying in the plane of the film along an easy axis of magnetization, a field coil having a plurality of turns wound around said element in a direction to produce an external magnetic field transverse to said axis, a direct current source for biasing said field coil and producing a steady magnetic field to cause rotation of said film magnetization away from said axis to bias said element to a predetermined state along its magnetoresistive characteristic, a load circuit shunting said film, a source of electrical energy connected to said film to produce a flow of current therein transverse to said axis, and an alternating current source for applying a time varying current to said coil to produce a time varying external field to cause rotation of said internal magnetic field from its quiescent state to vary the resistance of said film and the current flow therein and said load circuit.

References Cited by the Examiner

UNITED STATES PATENTS

| | | | |
|---|---|---|---|
| 1,765,607 | 6/1930 | Ohl | 330—62 X |
| 1,948,209 | 2/1934 | Fichandler | 331—107 X |
| 2,571,915 | 10/1951 | McCoubrey | 330—62 X |
| 3,048,797 | 8/1962 | Linder | 331—107 X |

ROY LAKE, *Primary Examiner.*

NATHAN KAUFMAN, *Examiner.*